US006098127A

United States Patent [19]

Kwang

[11] Patent Number: 6,098,127
[45] Date of Patent: Aug. 1, 2000

[54] INTERFACE SOCKET FOR TRANSMITTING BOTH SIGNAL TRANSMISSION AND POWER SUPPLY FROM MOTHERBOARD TO EXTERNAL PERIPHERAL

[76] Inventor: Yun-Ming Kwang, 4F, No. 5, Aly. 35, Ln. 118, Wu-Hsing st., Taipei, Taiwan

[21] Appl. No.: 09/105,326

[22] Filed: Jun. 26, 1998

[51] Int. Cl.[7] ...................... G06F 13/12
[52] U.S. Cl. ...................... 710/62; 710/64; 710/100; 361/683; 361/686; 439/502; 439/505
[58] Field of Search ...................... 710/8, 9, 12, 62, 710/64, 100; 439/61, 505, 218, 502; 361/683, 686

[56] References Cited

U.S. PATENT DOCUMENTS

| | | | |
|---|---|---|---|
| 5,187,645 | 2/1993 | Spalding et al. | 361/686 |
| 5,507,650 | 4/1996 | Larabell | 439/61 |
| 5,515,515 | 5/1996 | Kennedy et al. | 710/103 |
| 5,518,418 | 5/1996 | Larabell | 439/505 |
| 5,540,601 | 7/1996 | Botchek | 439/502 |
| 5,564,024 | 10/1996 | Pemberton | 710/103 |
| 5,666,557 | 9/1997 | Cassidy et al. | 710/8 |
| 5,726,922 | 3/1998 | Womble et al. | 364/708.1 |
| 5,784,644 | 7/1998 | Larabell | 710/9 |
| 5,852,544 | 12/1998 | Lee | 361/683 |
| 5,865,651 | 2/1999 | Dague et al. | 439/680 |
| 5,911,079 | 6/1999 | Yang et al. | 713/300 |

*Primary Examiner*—Thomas C. Lee
*Assistant Examiner*—Tammara Peyton
*Attorney, Agent, or Firm*—W. Wayne Liauh

[57] ABSTRACT

An external connecting interface which is capable to transmit both the power supply and digital signal of the computer motherboard to an external peripheral device through a single socket. The socket has a plurality of pins which includes at least two power transmission pins and a plurality of signal transmission pins. The power pins of the socket are coupled with the power supply of the computer motherboard for power transmission, while the signal transmission pins are coupled with the interface slots of the computer motherboard for signal transmission. A control chip may be included in the external connecting interface for controlling the signal transmission pins to couple with one of the interface slots. By using a cable to connect the external peripheral device to the socket, both the digital signal and power supply of the computer can be transmitted in the same time. It is convenient, has high compatibility, is low cost, and does not need additional external power supply or program driver.

18 Claims, 9 Drawing Sheets

INTERFACE SOCKET FOR TRANSMITTING BOTH SIGNAL TRANSMISSION AND POWER SUPPLY FROM MOTHERBOARD TO EXTERNAL PERIPHERAL

BACKGROUND OF THE INVENTION

1. Field of the Invention

This invention relates to an external connecting interface for computer peripheral devices and particularly to a connecting interface that can convert the IDE, SCSI, Serial Port or Parallel Port interface in a computer for connecting external peripheral devices.

2. Description of the Prior Art

Computer is now being widely used in almost all types of business, families and people around the world. In addition to data and word processing, computer function now combines communication and computing capabilities for processing multimedia function which includes words, sound and images, and is able to communicate with many other people locally or remotely. Multimedia applications usually need a powerful CPU and huge capacity of data storage devices such as CD-ROM device, high capacity hard disk or optical disk drive. In order to manage this constant need of increasing information capacity, a user either has to upgrade the hardwares or to add more capacity needed externally. To add more capacity externally is generally more flexible and convenient. Most computers now use SCSI or IDE as data interface for connecting peripherals, either internally or externally. IDE interface is generally more popular than SCSI interface.

Conventional methods for connecting computer peripheral devices such as external hard disk or CD-ROM usually use an external box or casing to contain the device, then use a cable to connect with the parallel port of the computer. Such connecting method has high portability and is easy to use. The parallel part is a standard interface for personal computer, and therefore is widely used.

However it also has the following disadvantages:

1. The parallel port interface is a low speed transmission interface generally used for connecting low speed peripheral devices such as printer. It is much slower than IDE interface and hence is not desirable for transmitting high speed information. Moreover parallel port interface has high probability of causing data loss when transmitting great amount of data.

2. In order to use parallel port interface for data transmission, a special driving program is needed to communicate with the computer since the connected external computer peripheral devices usually use IDE or SCSI interfaces. It is not convenient as not every user knows how to install the driving program. The driving program also will occupy some main memory. In some circumstance such as the computer is running under DOS operation system, it could result in insufficient memory or memory allocation error or conflict.

3. To use parallel port interface for data transmission needs a special hardware for transforming data signals between IDE/SCSI interface and Parallel Port interface. All external connecting devices require a special IC for this job. It is thus more expensive.

4. The external connecting devices also need a separate power supply. The power of the computer cannot be shared by the connected external devices. It becomes heavier and costs higher. In addition, it is not always convenient to find an additional power source for the external devices, especially when the external devices are connected with notebooks (e.g. portable computers) which are very likely to be operated and used at a place where is no electricity socket or additional power source available.

SUMMARY OF THE INVENTION

In view of aforesaid disadvantages, it is therefore an object of this invention to provide an external connecting interface for computer peripheral devices that can convert the IDE, SCSI, Serial port or Parallel port interface in the motherboard of computer directly to an external connecting interface for peripheral devices. Through a single cable, various external connecting peripheral devices may be directly connected to the computer without additional hardware or driving program. The power supply in the computer may also be used to provide power needed at the peripheral devices through the same cable without extra power supply. It therefore takes less number of components and is less expensive to produce.

BRIEF DESCRIPTION OF THE DRAWINGS

The invention, as well as its many advantages, may be further understood by the following detailed description and the following detailed and drawings in which.

DETAILED DESCRIPTION OF THE PREFERRED EMBODIMENT

Figure 1:
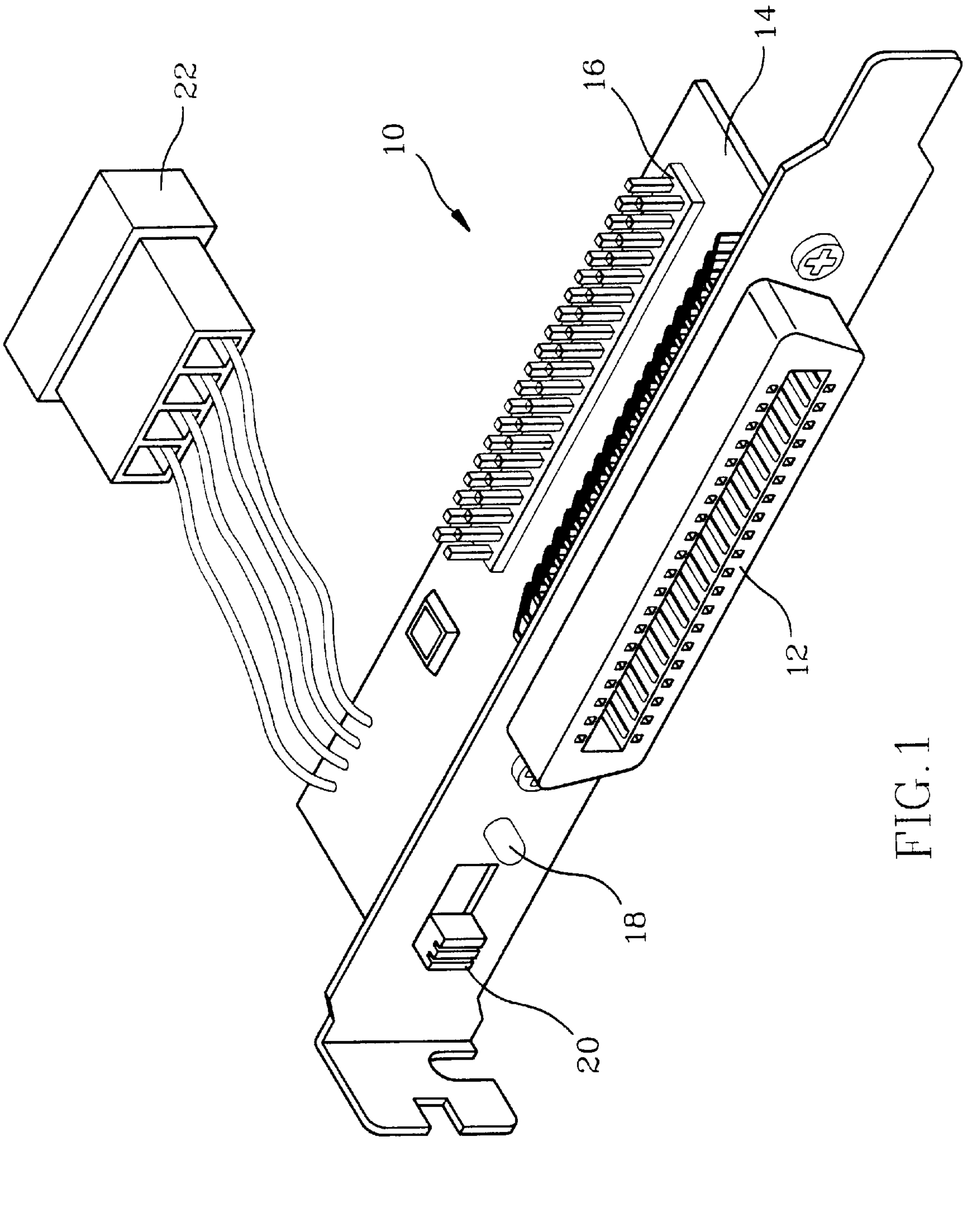
FIG. 1 is a perspective view of a first embodiment of this invention.

Referring to FIG. 1 for a first embodiment of this invention, which illustrates an external connecting interface 10 suitable for connecting an external IDE peripheral device. The external connecting interface 10 includes a SCSI socket 12, a circuit board 14, an IDE socket 16, a power LED 18, a power switch 20 and a power plug 22.

As a conventional SCSI interface generally has fifty pins, wherein each pin represents an information transmission path, and an IDE interface usually has only forty pins (shown in FIG. 1). Through circuit board 14 design, forty pins of the SCSI socket 12 may respectively couple with the forty pins of the IDE socket 16 for transmitting digital signal. The extra ten pins in the SCSI socket 12 may be allocated for other use, such as four pins may couple with the power LED 18, power switch 20 and power plug 22 for transmitting power supply.

Figure 2:
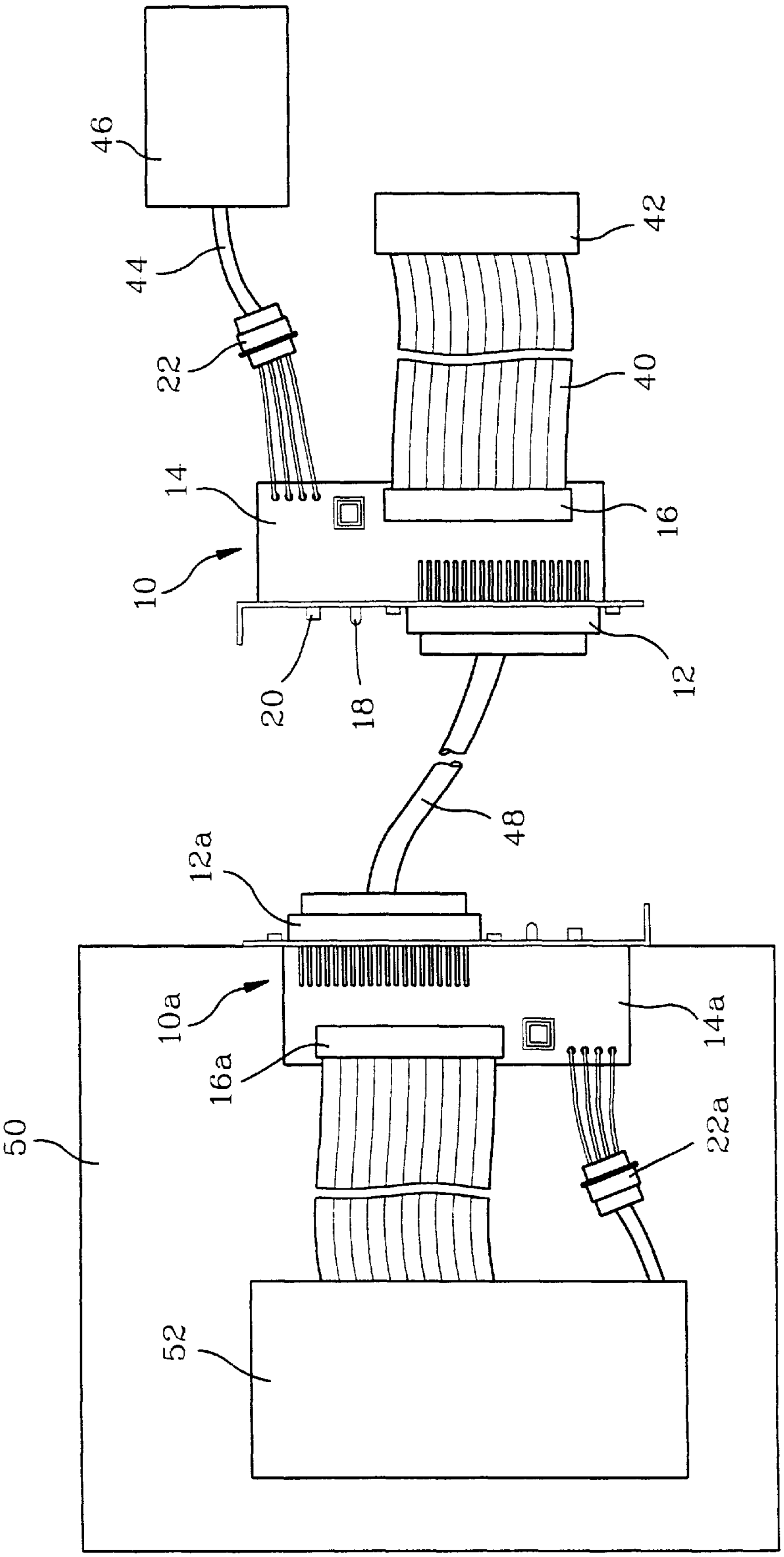
FIG. 2 is a top view of the first embodiment in use.

As depicting in FIG. 2, when this invention is in use, the IDE socket 16 may link to an IDE interface slot 42 in the computer (not shown in the figures) via a flat cable 40. The power plug 22 connects with a power line 44 in the computer. The power source is the power supply 46 in the computer.

The SCSI socket 12 connects with an external peripheral device 50 via a SCSI cable 48. The external peripheral device 50 also has a SCSI socket 12*a*, a circuit board 14*a*, an IDE socket 16*a* and a power plug 22*a* for receiving driving and control signals, and power from the computer. A hard disk 52 which has an IDE interface also may be driven and powered the same way. Digital signal transmission between the hard disk 52 and the computer, and power transmission are through the same SCSI cable 48.

Since data transmission and processing directly go through the forty pins IDE interface, which in turn can directly connect various external IDE peripheral devices, it can transmit data at fast speed and is lower cost than conventional way which uses parallel port interface to connect external IDE devices.

According to this invention, the external connecting interface 10 further has a power LED 18 and a power switch 20. When the power switch 20 is at "ON" position, the power line is active. The peripheral device 50 receives power from the power supply in computer via the SCSI cable 48. At this state, the power LED 18 is turned on to show power on status. When the power switch is at "OFF" position, the power supply from computer is cutoff. The peripheral device 50 may use its own power supply (a transformer or battery), and the power LED 18 is turned off.

Figure 3:
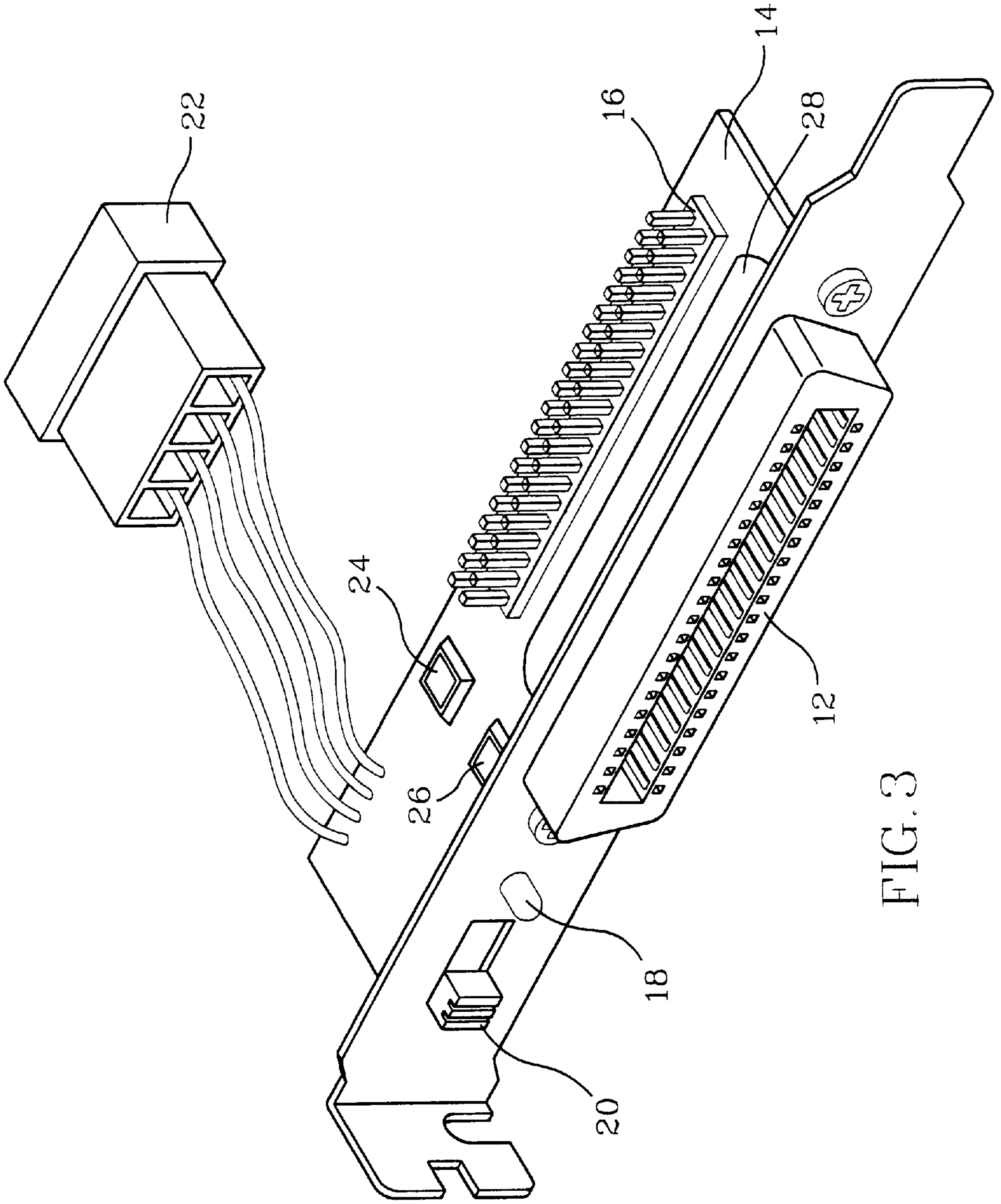
FIG. 3 is a perspective view of a second embodiment of this invention.

FIG. 3 illustrates a second embodiment of this invention. On the circuit board 14, there is provided with an electric current protector 24 for stabilizing power supply. It cuts off power supply when voltage is unstable or overloaded so that the computer and peripheral devices may be protected from damage. It may also include a signal amplifier 26 for filtering and amplifying the signals so that peripheral devices at remote location may receive strong enough signals for normal operation. The wiring between the SCSI socket 12 and the circuit board 14 may be covered by an insulating material 28 to prevent short circuit and to reinforce the binding strength.

Figure 4:
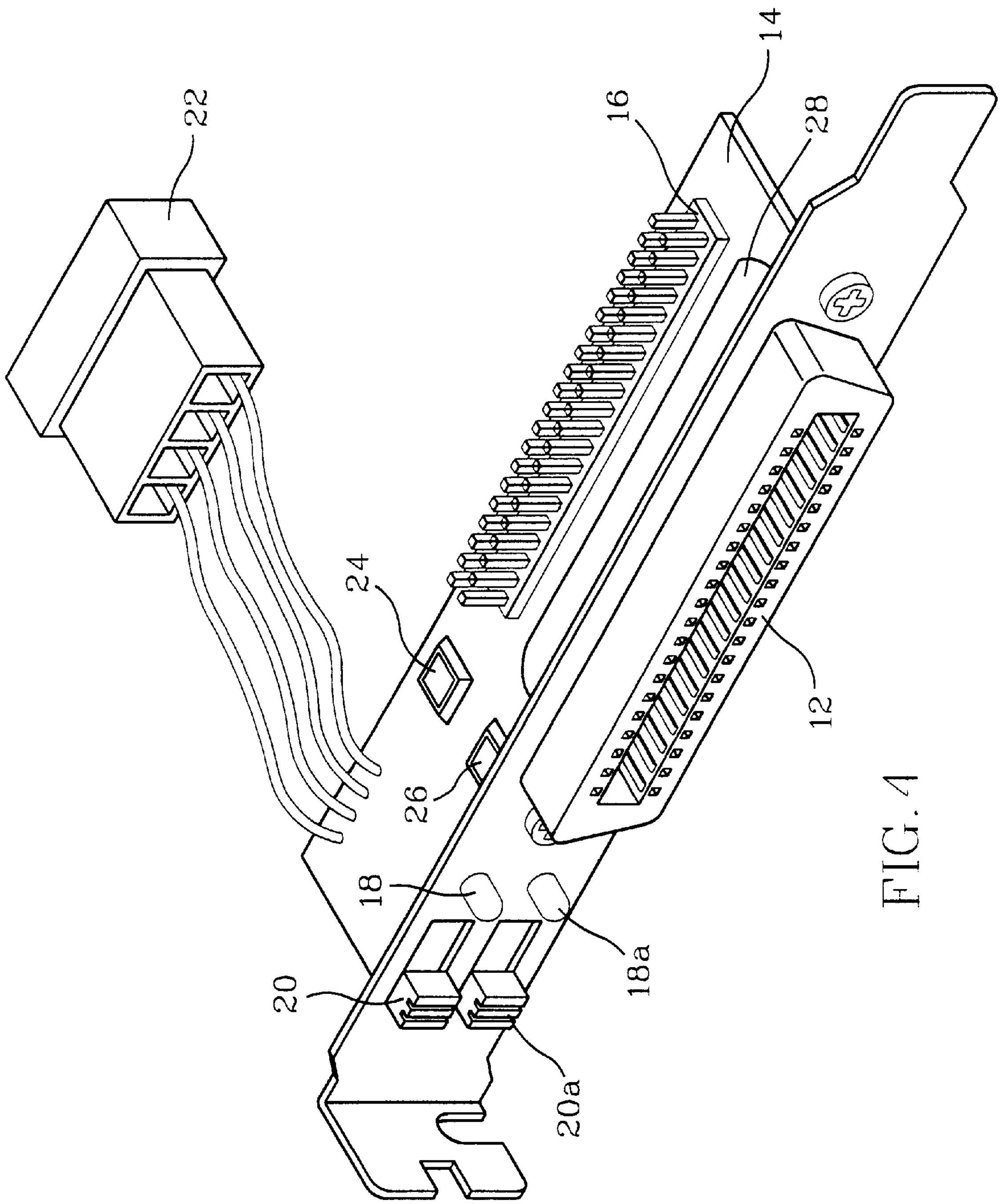
FIG. 4 is a perspective view of a third embodiment of this invention.

FIG. 4 shows a third embodiment of this invention in which the IDE socket supports two peripheral devices. Among the ten extra pins at the SCSI interface (than that of the IDE interface), two sets of lines (e.g., eight pins) have been allocated for power supply use. Same SCSI cable and a branch connector (not shown in the figure) may be used for connecting two sets of external peripheral devices. Two sets of power switches 20, 20*a* and power LED 18, 18*a* are provided for control these two peripheral devices.

In general, the elder version of computer motherboard (such as 486 class) has only one IDE interface slot (i.e., can support only two IDE peripheral devices). The modern version of computer motherboards usually have at least two IDE interface slots. Employing this invention, the IDE interface slot can connect with both a hard disk internally and the IDE socket 16 of this invention via a flat cable. The IDE socket 16 of this invention may therefore further connect another peripheral device externally (hard disk, CD ROM or etc.). Another alternative is to use this invention for connecting two external peripheral devices or to add one more IDE interface slot to expand CPU supporting peripheral capability. The configuration and selection of peripheral devices is thus more flexible, economic and effective.

A modern type of motherboard (such as 586 or above) normally has at least two IDE interface slots and can support at least four IDE peripheral devices. Using this invention, some IDE peripheral devices which are used to be built-in (e.g., connected internally) such like IDE hard disk and CD-ROM may be extended and located outside the computer (e.g., connected externally). And there is no problem concerning the price, comparability, speed, power supply and driving programs resulting from the parallel port interface. Therefore using this invention can allocate computer resources more flexibly and effectively. It is also more cost effective.

Figure 5:
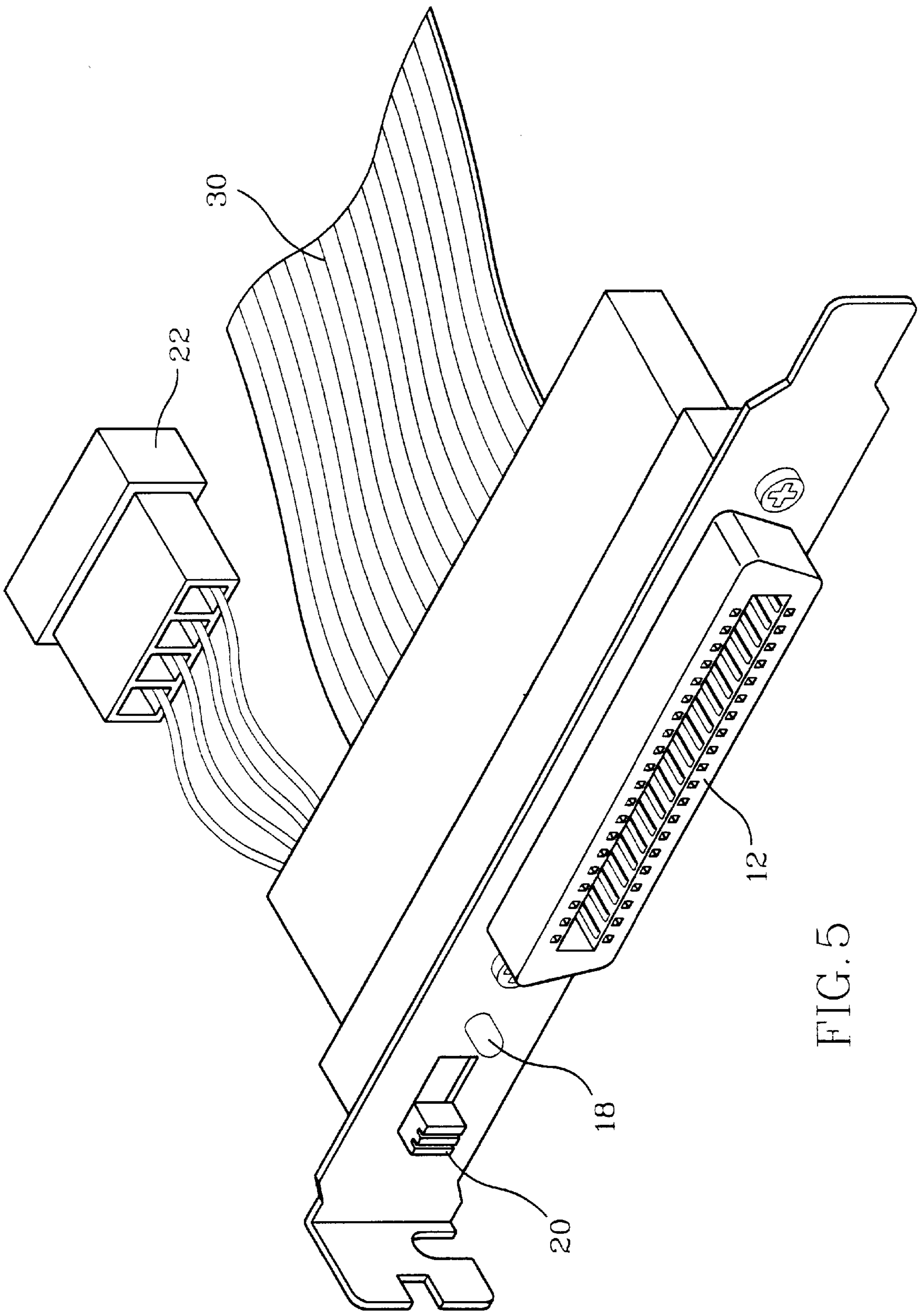
FIG. 5 is a perspective view of a fourth embodiment of this invention.

FIG. 5 illustrates a fourth embodiment of this invention. It adopts an integral molded type design. The components on the circuit board are covered and packaged by an insulating material. Only IDE flat cable 30 and power supply plug 22 are being extended out of the circuit board. The structure is thus stronger and looks more appealing.

It is to be understood that the descriptions and preferred embodiments set forth above are only to serve for illustrate purpose, and do not intent to limit the scope of the present invention. For instance, the fifty pins SCSI socket 12,12*a* and the cable 48 are very popular and low priced products in market place. Other types of socket and cables having sufficient pins for transmitting both signal and power source may also be used with equally good result, such as socket types (or connector types) of D-Sub, IDE, Half Pitch SCSI, Half Pitch Centronic or Centronic Connector. The cable may be a round cable or flat cable. In addition, the circuit board 14 may further link externally a serial port or parallel port for connecting mouse, fax modem or printer, and making configuration of peripheral devices more flexible.

Of course, it is to be understood that the present invention is not only applicable for connecting external IDE peripheral devices by using SCSI socket 12 and cable 48 as shown in FIGS. 1 to 5, but also applicable for connecting external SCSI peripheral devices, parallel port interfaced peripheral devices and serial port interfaced peripheral devices. Generally, a modern type of motherboard of computer is furnished with at least a parallel port interface, a serial port interface, a SCSI interface slot and two IDE interface slots. The primary feature of the present invention is to extend these interface ports and slots as well as the computer power source out of the computer for connecting with external peripheral devices by using a single cable such that no additional or external power source will be needed for the external peripheral devices. This is especially useful for a notebook (or portable) computer user since the notebook computer is usually very compact and has no extra space for accommodating many peripheral devices internally. Notebooks are also very likely to be operated and used at a place where is no electricity socket or additional external power source available for the external peripheral devices.

Figure 6:
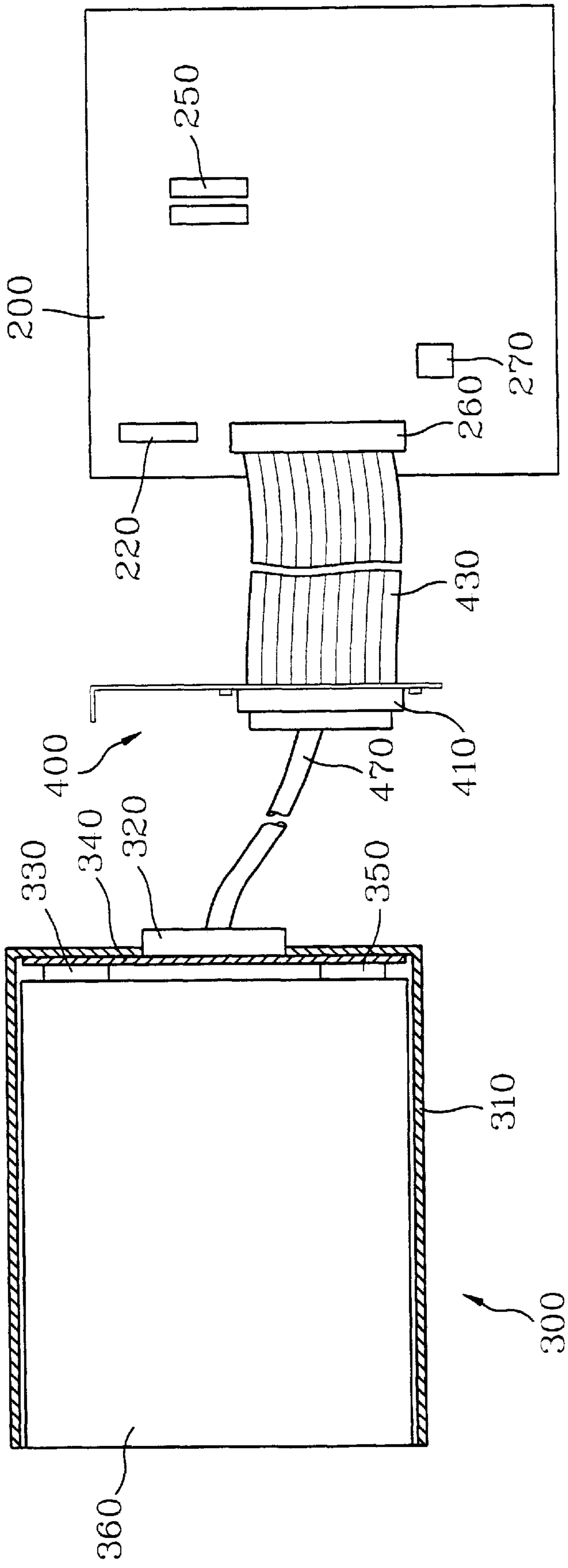
FIG. 6 is a top view of a fifth embodiment of this invention.

FIG. 6 shows a fifth embodiment of this invention. It uses an external connecting interface 400 as transmission interface between the computer motherboard 200 and IDE external peripheral device 300 for transmitting signal and power thereof. The motherboard 200 has a power supply socket 220 for connecting to a power supply which is not shown in the figure and at least one IDE interface slot 250 (i.e., IDE-slot. A motherboard usually has two IDE interface slots, namely IDE-slot one and IDE-slot two) for transmitting respectively power supply and IDE signal.

The external connecting interface 400 includes a socket 410 which is preferably a fifty-pin SCSI socket for transmitting both digital signal and power supply. The following description of the preferred embodiment is based on the SCSI socket, however any socket (or connector) such as SCSI socket/connector, D-Sub socket/connector, IDE socket/connector, Half Pitch SCSI socket/connector or Centronic socket/connector which has sufficient pins may also be used as the socket 410. The socket 410 connects to a special interface slot 260 (preferably a SCSI-typed slot) in the computer motherboard 200 through an interface flat cable 430 (either a SCSI flat cable or any type of cable which has sufficient pins). The computer motherboard 200 further has a control chip 270 furnished thereon. By means of the layout of the computer motherboard 200, most pins (for example, forty pins) of the special interface slot 260 are firstly coupled with the control chip 270, and then further coupled with both of the IDE interface slots 250 on the computer motherboard 200 for digital signal transmission and thus are called as signal transmission pins. Some of other pins (for example, two or four or eight pins) of the special interface slot 260 are coupled with the power supply socket 220 by means of the layout on the computer motherboard 200 for power supply transmission and thus are called as power transmission pins. Therefore, the electric power of the computer motherboard 200 can transmit respectively through the layout on the computer motherboard 200, the special interface slot 260 and the interface flat cable 430, and then transmit to the socket 410 for connecting to an external peripheral device 300. In addition, the digital signal of the IDE interface slots 250 may also transmit to the socket 410 through the layout of the computer motherboard 200, the control chip 270, the special interface slot 260, and the interface flat cable 430. The control chip 270 takes an important part in this preferred embodiment since the special interface slot 260 is coupled with two IDE interface slots 250 in the same time. The primary object of the control chip 270 is to decide and control the signal-transmitting pins of the special interface slot 260 to couple with one and only one of the two IDE interface slots 250 for transmitting IDE signals thereof.

The control chip 270 has a built-in control logic for automatically monitoring the using status of the two IDE interface slots 250, and automatically switching the special interface slot 260 to connect with either of the IDE interface slots 250. For instance when the control chip 270 detects the IDE-slot one on the motherboard 200 still has a position available for connecting with another IDE device (e.g., the IDE-slot one is currently used by only one IDE device), the control chip 270 will connect the special interface slot 260 to the IDE-slot one. When the control chip 270 detects that the IDE-slot one is full (e.g., used by two IDE devices) but the IDE-slot two still has position, then the control chip 270 will automatically connects the IDE-slot two with the special interface slot 260 and cuts off the connections between the IDE-slot one and the special interface slot 260. When the control chip 270 detects that both IDE slots are fully occupied, it will automatically disable the special interface slot 260 to avoid conflict. Of course it may also add a switch on the motherboard 200 to control manually or by program for switching connection between the special interface slot 260 and the IDE-slot one and IDE-slot two. Furthermore the special interface slot 260 has at least two pins coupled with the power supply socket 220 for linking motherboard power supply to the socket 410 via the interface flat cable 430. Of course those pins for power supply may also be connected to the control chip 270. Thus the control chip 270 can also control power supply. The motherboard may further include a current buffer and signal amplifier (not shown in the picture) for protecting circuit and amplifying signals.

FIG. 6 shows that the external peripheral device 300 is connected by a round cable 470 to the socket 410 for both digital signal transmission and power supply. The round cable 470 is preferably a standard SCSI round cable which will be so referred to hereunder.

The external peripheral device 300 may include a casing 310 and an IDE peripheral device 360 (such as an IDE interfaced hard disk, CD-ROM or tape driver) housed in the casing 310. In the casing 310, there is a peripheral SCSI socket 320 for connecting the SCSI round cable 470. The pins in the peripheral SCSI socket 320 are respectively connected to a peripheral circuit board 340 and through which to transmit signals to a peripheral transmitting port 330 attached to the peripheral circuit board (the peripheral transmitting port 330 is preferably an IDE port which can directly mate with the IDE port of the IDE peripheral device 360). And the pins in the SCSI socket 320 for power supply are connected to a peripheral power supply port 350 attached to the peripheral circuit board 340 for transmitting power to the IDE peripheral device 360. Therefore when the IDE peripheral device 360 is located in the casing 310, the digital signal and power supply plugs of the IDE peripheral device 360 may hook up respectively to the peripheral transmitting port 330 and power supply port 350 for receiving IDE signals and power supply from the motherboard 200 via the external connecting interface 400 without the need of another external power supply (such as transformer). It thus does not need low speed parallel port for data transmission nor additional power source.

Various modifications may be made by those skilled in the art base on above disclosure, for instance, the casing 310 may include a power supply receptacle (not shown in the picture) connecting to the peripheral circuit board 340 which may further includes a switch (not shown in picture) so that users may have alternatives of power supply from an additional external power source (e.g., a DC transformer) or via the computer motherboard 200 and flat cable 470. Another modification is to add a branch cable (not shown in the picture) on the round cable 470 for connecting with two external IDE peripherals 300 in the same time.

More embodiments will be shown hereunder. Same components as set forth above will be marked by same numerals.

Figure 7:
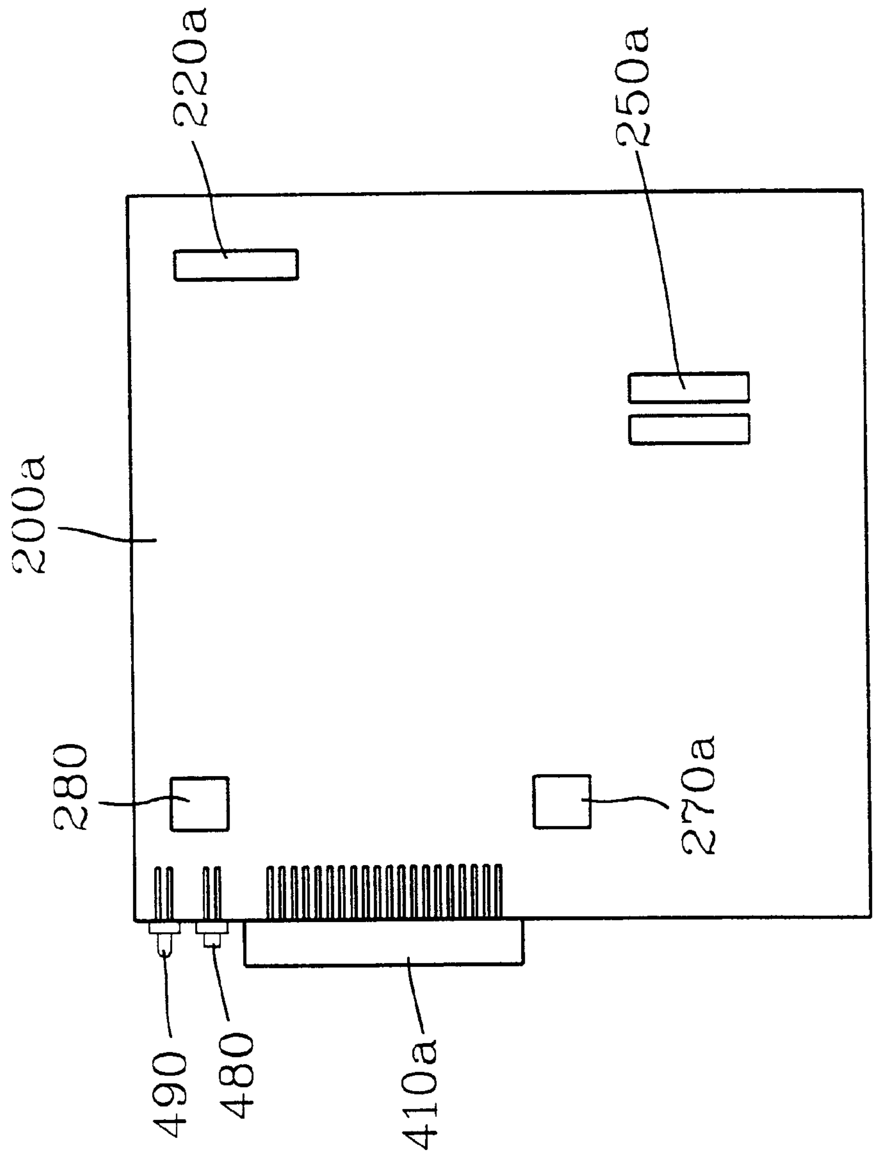
FIG. 7 is a top view of a sixth embodiment of this invention.

FIG. 7 depicts a sixth embodiment of this invention for an ordinary motherboard or notebook computer motherboard **200*a*. As a portable or notebook computer has limited internal space, the external connecting interface 400** as illustrated previously is made smaller size in this preferred embodiment.

The socket **410*a* is directly furnished on the motherboard 200*a* without the interface flat cable 430 as that shown in FIG. 6. The socket 410*a* may be directly mounted or soldered to the motherboard 200*a* or engage with a socket (not shown in the picture) located on the motherboard 200*a*. The motherboard 200*a* may also have a power supply port 220*a*, two IDE interface slots 250*a*, a control chip 270*a* and a current buffer and signal amplifier 280. These components are coupled through the layout of the motherboard 200*a*. The motherboard 200*a* may further include at least one switch 480 for switching and connecting the socket 410*a* to one of the two IDE interface slots 250*a*, and an LED indicator 490 for indicating power supply status. Of course an additional switch (not shown in the figure) may be added on the motherboard 200*a* for controlling power supply of the socket 410*a*, or the control chip 270*a* may automatically decide and control the socket 410*a* to connect which IDE interface slot 250*a***.

Figure 8:
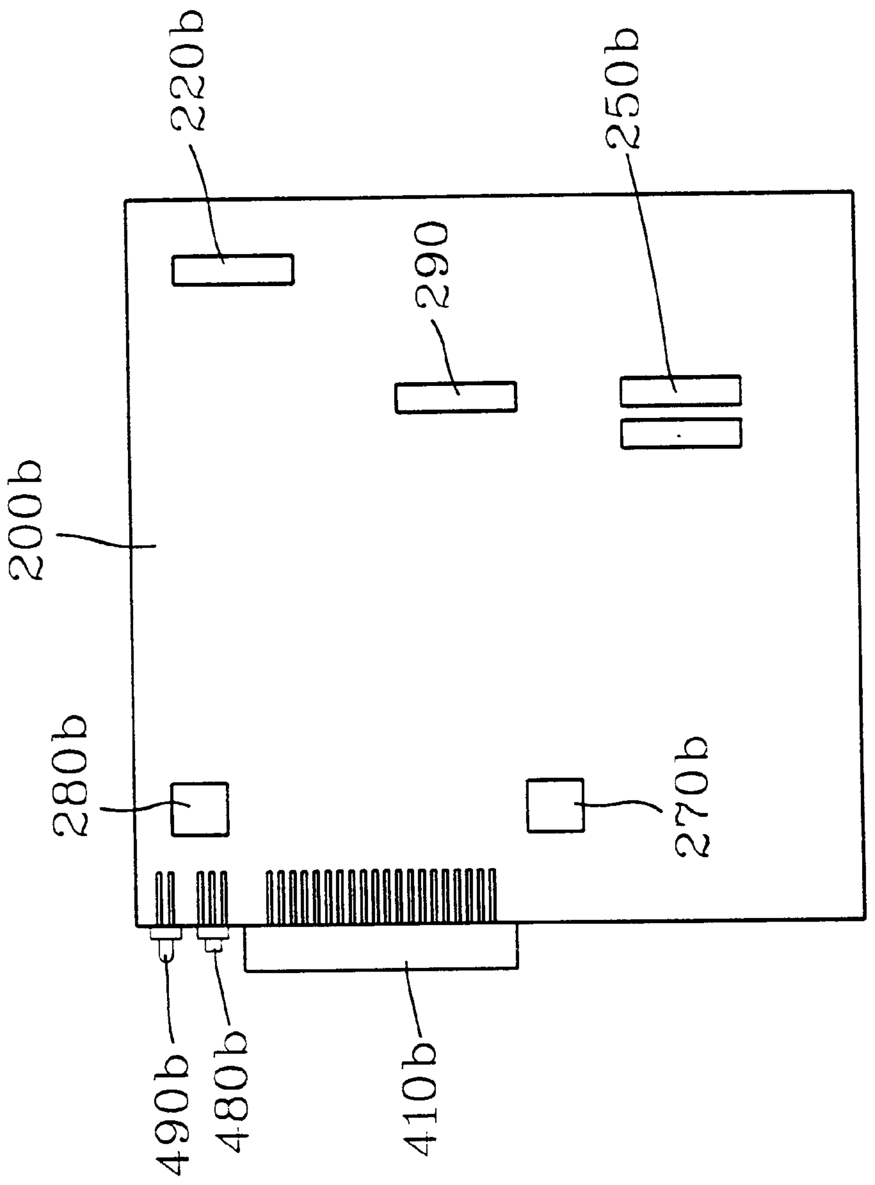
FIG. 8 is a top view of a seventh embodiment of this invention.

FIG. 8 illustrates a seventh embodiment of this invention. It is largely constructed like the one shown in FIG. 7. It includes a computer motherboard **200*b* which has a socket 410*b*, a power supply port 220*b*, two IDE interface slots 250*b*, a control chip 270*b*, a current buffer and signal amplifier 280*b*, at least one switch 480*b* and one LED indicator 490*b***. It is noted that, although a standard SCSI interface has fifty pins, not all of these fifty pins are used for transmitting signals. There are still some of the pins unused (e.g., kept idle) for most types of SCSI peripheral devices. Thus it is possible to use these pins to transmit electric power.

In this embodiment as shown in FIG. 8, the motherboard 200*b* further has a built-in SCSI interface slot 290. Most or all of the pins in the socket 410*b* (SCSI socket preferred) are coupled with the control chip 270*b*, then coupling with the IDE interface slots 250*b* and SCSI interface slot 290 by means of the layout on the motherboard 200*b*. The control chip 270*b* automatically detects if the peripheral devices connected to the socket 410*b* are employing IDE or SCSI interface, and then automatically switches the signal-transmitting pins in the socket 410*b* to couple with one and only one of the IDE and SCSI interface slots 250*b*,290. Of course the switch 480*b* may include a switching selection (or another switch) for users to manually couple the socket 410*b* to the IDE interface slots 250*b* or SCSI interface slot 290. Of course, any one who is skilled in the art may be very easy to modify the above mentioned embodiment such that the socket 410*b* may couple only with the SCSI interface slot 290 without coupling with the IDE interface slots 250*b* for connecting with only SCSI peripheral devices. Therefore this invention may connect external IDE or SCSI peripheral devices, or both.

Figure 9:
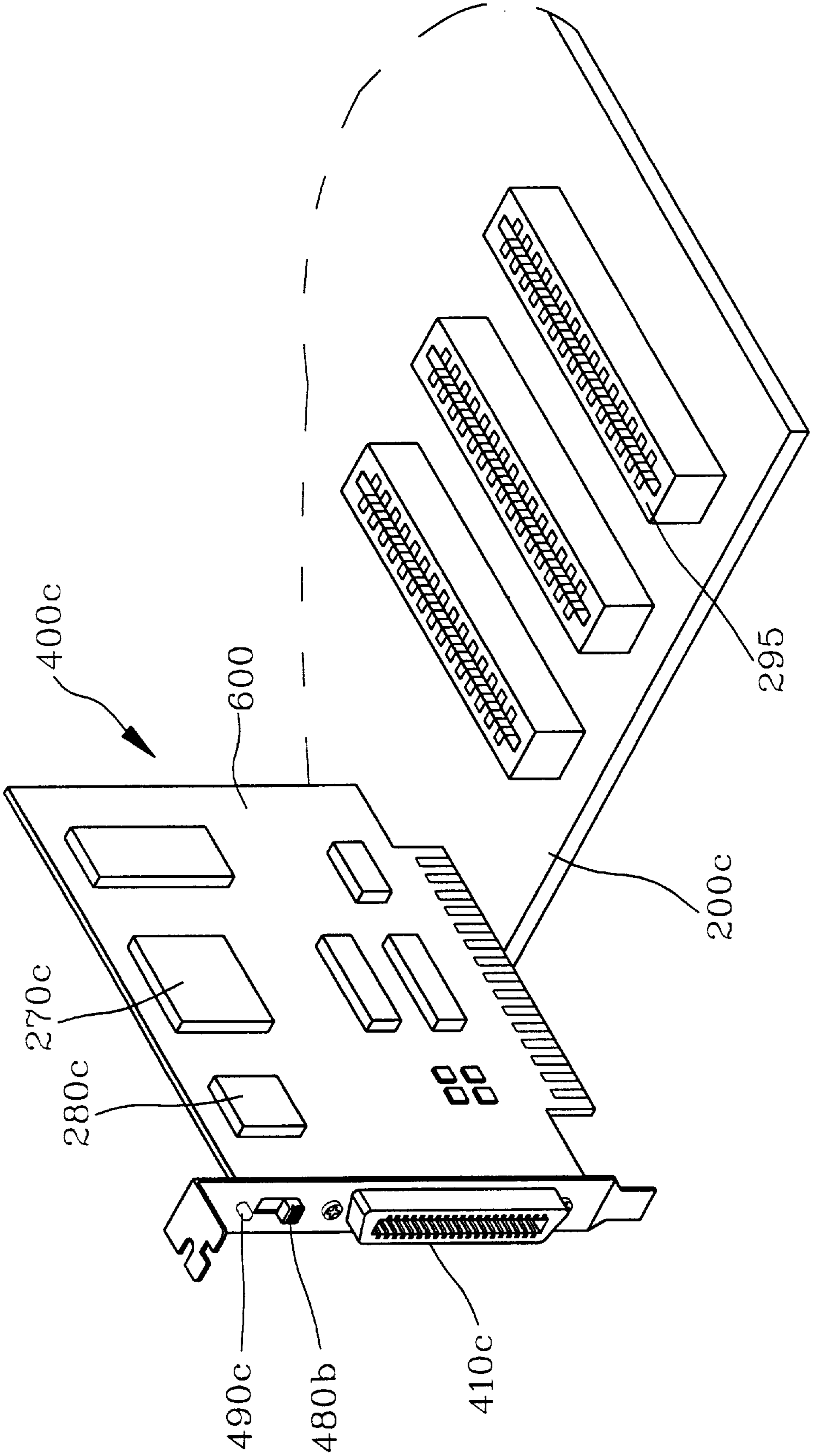
FIG. 9 is a perspective view of an eighth embodiment of this invention.

Please refer to FIG. 9 which illustrates a eighth preferred embodiment of an external connecting interface in accordance with the present invention. The external connecting interface 400*c* may be formed like a standard interface card 600 (also called as Gold Finger Card) which is suitable to mate with a interface slot 295 furnished on the computer motherboard 200*c*. Although the interface card 600 shown in the FIG. 9 is an ISA type interface card and the interface slots 295 shown are also ISA slots, it is noted that the interface slot 295 may also be the type of VESA or PCI slot, and the interface card 600 may be the same type as which of the interface slot 295. The external connecting interface 400*c* also includes a socket 410*c* (preferably a SCSI socket), at least a switch 480, at least an LED indicator 490, a current buffer and signal amplifier 280*c* and a control chip 270*c* mounted on the interface card 600. By plugging the interface card 600 in the interface slot 295 of the computer motherboard 200*c*, the pins of the socket 410*c* can be coupled with the pins of the interface slot 295 through the layout on the interface card 600. Thus, by the layout and circuit design of the computer motherboard 200*c*, the digital signals and the power supply of the computer motherboard 200*c* may be transmitted to an external peripheral device via the interface card 600 and the socket 410*c*.

Although the above described embodiments are using standard fifty-pins SCSI socket and cable to connect with external IDE or SCSI peripheral devices, it is noted that any socket or cable having sufficient pins may also be used in this invention for transmitting both digital signal and power supply in the same time through the single cable. In addition, this invention is not only capable for connecting external IDE or SCSI peripheral devices, but also capable for connecting external peripheral devices of parallel-port or serial-port interfaces, for example, optical scanner, portable printer or etc. It is possible since, although a standard parallel-port interface has twenty-five pins, not all of these twenty-five pins are used for transmitting signals. There are still some of the pins unused (e.g., kept idle) for various types of parallel-port interfaced peripheral devices. Thus it is possible to use these idle pins to transmit electric power. The only thing to do is to re-design the layout of the circuit board, interface card or motherboard such that the signal-transmitting pins of the socket of the external connecting interface of the present invention can be coupled with the parallel/serial port of the computer motherboard while the power-transmitting pins of the socket are still coupled with the power supply of the computer motherboard. Therefore, it is still capable to transmit both digital signal and power supply through a single socket and cable.

In summary, this invention has the following main features:

1. fully uses existing IDE or SCSI interface in the computer motherboard. Most 486 and all 586 or above motherboards have at least two IDE enhanced interfaces (one primary IDE, another secondary IDE) and one SCSI interface. Each IDE interface can control two IDE peripheral devices. A SCSI interface can serially connect seven SCSI peripheral devices. Practically, a computer uses only one or two IDE/SCSI devices. Hence at least one IDE or SCSI interface will be idle. The invention uses this idle IDE or SCSI interface for connecting various external peripheral devices.

2. directly uses the IDE interface in the PC motherboard to connect external IDE device, or SCSI interface to connect external SCSI device. Data transmission is faster, error is fewer and no additional driving program is needed.

3. directly transmits power from the computer to the peripherals without the need of additional or external power supply, saves total cost.

4. has power switch and indicator for selecting either computer power supply or external power supply (for those peripherals with built-in power supply or high-power needed peripherals). User can choose to use an additional power supply connected externally or the computer power supply connected internally. It is thus safer and more flexible.

5. may include current protection and signal amplifying device for protecting the external peripheral devices when the power supply is unstable, and enables long distance or remote peripheral devices to function well with strong enough signals.

6. may use round or flat cable to connect the external peripheral devices. It is more flexible.

7. the circuit design may be included and layout on the computer motherboard. It may save space and cost, and is particularly desirable for portable or notebook computers.

8. uses a control chip to automatically detect and control which IDE or SCSI interface slot to connect with the socket spins. It may include additional switch for manually or automatically selecting the socket pins to connect which IDE or SCSI interface slot. It is more flexible.

9. any socket or cable may be applicable for use in the present invention to transmit both digital signal and power supply in the same time.

10. the external connecting interface of the present invention is not only capable for connecting external IDE peripheral devices, but also capable for connecting external peripheral devices of SCSI, parallel-port or serial-port interfaced types.

What is claimed is:

1. An external connecting interface for computer peripheral device, comprising:

a circuit board;

a socket for connecting an external peripheral device, said socket being furnished on the circuit board and having a plurality of pins which includes a plurality of signal transmission pins and at least two power transmission pins;

means for connecting said pins of the socket with a computer motherboard, said computer motherboard being furnished with a plurality of interface slots and a power supply;

wherein the signal transmission pins of the socket connecting with one of the interface slots for signal transmission, the power transmission pins connecting with the power supply for power transmission, such that both the signal transmission and power supply of the computer motherboard may be transmitted to the external peripheral device via the same socket;

further wherein the circuit board further furnished with at least a switch and an LED indicator for indicating power supply status of the socket, and the switch is for switching the connection between the signal transmission pins of the socket with either one of the interface slots of the computer motherboard, so as to switch the transmission of the power supply.

2. The external connecting interface for computer peripheral device of claim 1, wherein the socket connects the external peripheral device through a cable, the socket having sufficient pins for transmitting both signal and power and is chosen from a group consisting of SCSI socket, D-Sub socket, IDE socket, Half Pitch SCSI socket and Centronic socket; wherein the cable is the same type as which of the socket.

3. The external connecting interface for computer peripheral device of claim 1, wherein the external peripheral device is of a type chosen from a group consisting of IDE interfaced peripheral device, SCSI interfaced peripheral device, parallel-port interfaced peripheral device and serial-port interfaced device.

4. The external connecting interface for computer peripheral device of claim 1, wherein the interface slot furnished on the computer motherboard is of a type chosen from a group consisting of IDE interfaced, SCSI interfaced, parallel-port interfaced and serial-port interfaced.

5. The external connecting interface for computer peripheral device of claim 1, wherein the circuit board has a current protecting member.

6. The external connecting interface for computer peripheral device of claim 1, wherein the circuit has a signal amplifying member.

7. An external connecting interface for computer peripheral device, comprising:

a circuit board;

a socket for connecting an external peripheral device, said socket being furnished on the circuit board and having a plurality of pins which includes a plurality of signal transmission pins and at least two power transmission pins;

means for connecting said pins of the socket with a computer motherboard, said computer motherboard being furnished with a plurality of interface slots and a power supply;

wherein the signal transmission pins of the socket connecting with one of the interface slots for signal transmission, the power transmission pins connecting with the power supply for power transmission, such that both the signal transmission and power supply of the computer motherboard may be transmitted to the external peripheral device via the same socket;

further wherein the circuit board further furnished with at least a switch and an LED indicator for indicating power supply status of the socket, and said at least two power transmission pins of said socket are for supplying power to two sets of external peripheral devices, the circuit board having two sets of LED indicators and switches for controlling power supply of the two external connecting peripheral devices.

8. The external connecting interface for computer peripheral device of claim 1, wherein the socket connects the external peripheral device through a cable which is of a type chosen from a group consisting of round cables and flat cables.

9. An external connecting interface for power supply and signal transmission between an external peripheral device and a computer motherboard which has at least one interface slot, comprising:

a socket which has a plurality of pins for connecting the external peripheral device;

wherein said pins of said socket being connectable to the computer motherboard, a relatively major part of the pins being coupled with the interface slot for digital signal transmission, at least two pins being connected with a power supply in the computer for power transmission, such that both digital signal and power supply can be transmitted via the same socket;

further wherein the computer motherboard is further furnished with a special interface slot, the special interface slot being coupled with the interface slot and the power supply by means of circuit layout of the computer motherboard, said special interface slot being connectable with said socket by means of a interface flat cable.

10. The external connecting interface of claim 9, wherein said pins of the socket are connected to the computer motherboard by directly soldering said socket onto the computer motherboard.

11. The external connecting interface of claim 9, wherein the pins of the socket are coupled with the interface slot and power supply by means of circuit layout on the computer motherboard.

12. The external connecting interface of claim 9, wherein the socket is a SCSI socket.

13. The external connecting interface of claim 9, wherein the external peripheral device is of a type chosen from a group consisting of IDE interfaced peripheral device, SCSI interfaced peripheral device, parallel-port interfaced peripheral device and serial-port interfaced device.

14. The external connecting interface of claim 9, wherein the interface slot is of a type chosen from a group consisting of IDE interfaced, SCSI interfaced, parallel-port interfaced and serial-port interfaced.

15. The external connecting interface of claim 9, wherein the computer motherboard further has a control chip coupled with the pins for signal transmission in the socket, the computer motherboard having at least two interface slots furnished thereon, the control chip further coupling with the interface slots for controlling and switching the connection between the signal transmission pins and one of the interface slots; wherein the control chip includes a control logic for determining and controlling the signal transmission pins of the socket to connect with one of the interface slots according to interface slot using status of the computer motherboard.

16. The external connecting interface of claim 15 wherein the interface slots includes at least one IDE interface slot and one SCSI interface slot, the control chip controlling connection between the signal transmission pins and only one of the IDE or SCSI interface slot, and automatic connection switching between the slot and only one of the IDE or SCSI interface slot.

17. The external connecting interface of claim 9, wherein the peripheral device includes an IDE peripheral device and a casing for housing the IDE peripheral device, the IDE peripheral device having a signal plug and a power supply plug furnished thereon, said casing including a peripheral circuit board and a peripheral SCSI socket mounted on the peripheral circuit board, the circuit board having a peripheral transmission port connectable with the signal plug and a peripheral power supply port connectable with the power supply plug.

18. The external connecting interface of claim 9, wherein said at least one interface slot includes at least one IDE interface slot and at least one SCSI interface slot, the signal transmission pins of the socket being connectable to the SCSI and IDE interface slots, and through a switch on the computer motherboard the signal transmission pins connection between the socket and one of the interface slots can be manually switchable.

* * * * *